United States Patent [19]

Haluska

[11] Patent Number: 4,460,638
[45] Date of Patent: Jul. 17, 1984

[54] FIBER REINFORCED GLASS MATRIX COMPOSITES

[75] Inventor: Loren A. Haluska, Midland, Mich.

[73] Assignee: Dow Corning Corporation, Midland, Mich.

[21] Appl. No.: 482,679

[22] Filed: Apr. 6, 1983

[51] Int. Cl.$^3$ .............................................. D03D 3/00
[52] U.S. Cl. .................................... 428/224; 156/89; 156/155; 156/296; 156/307.5; 156/307.7; 156/329; 427/387; 428/232; 428/245; 428/260; 428/269; 428/290; 428/294; 428/367; 428/391; 428/408; 428/447; 428/902
[58] Field of Search ............... 156/89, 155, 296, 307.3, 156/307.7, 329, 307.5; 428/224, 391, 392, 367, 408, 446, 902, 232, 260, 266, 269, 272, 290, 294, 447; 427/387

[56] References Cited

PUBLICATIONS

S. R. Levitt, Journal of Materials Science 8 (1973), 793–806, "High–Strength Graphite Fiber/Lithium Aluminosilicate Composites".

J. J. Brennan, United Technologies Research Center, Aug. 15, 1979, Annual Report, Report R79-914401-2, "Program to Study SiC Fiber Reinforced Glass Matrix Composites".

J. F. Bacom et al., United Tech. Research Center, Jun. 1978, Report N79-11126, "Research on Graphite Reinforced Glass Matrix Composites".

*Primary Examiner*—James J. Bell
*Attorney, Agent, or Firm*—Richard A. Kaba

[57] ABSTRACT

What is disclosed is a method of preparing fiber reinforced glass composites from high modulus fibers, such as carbon fibers and silicon carbide fibers, and silazane polymers. The composites are obtained by heating a pressed and post-cured prepreg to an elevated temperature in an inert atmosphere. Prepregs containing silicon carbide fibers can be fired in air. A simple, low temperature laminating procedure is used in the preparation of these composites in place of the standard hot pressing technique.

64 Claims, No Drawings

FIBER REINFORCED GLASS MATRIX COMPOSITES

BACKGROUND OF INVENTION

This invention deals with new and novel fiber reinforced glass composites. Ceramics as high performance engineering materials have been more of a novelty than a commercially successful technical venture owing to the many disadvantages associated with the manufacture of these types of materials.

In order for ceramics to find wider applicability as engineering materials, major improvements in strength and toughness, i.e. improved resistance to thermal and mechanical shock, are required. A great potential for ceramics as high performance engineering materials exists in many applications provided that ceramics which are not intrinsically flaw sensitive or brittle can be produced with relative ease. For example, monolithic silicon carbides and silicon nitrides with modulus of rupture (MOR) greater than 50,000 psi have been prepared.

Several attempts at preparing better ceramic composites have been disclosed. One such attempt is disclosed in an article by S. R. Levitt entitled "High-strength graphite fiber/lithium aluminosilicate composites", J. Mat. Sci., 8, 793(1973). Levitt discloses that ceramic matrix compositions having the composition $Li_2O.Al_2O_3.nSiO_2$ wherein n has a value of 3, 4 and 8, have been developed with a high volume fraction of unidirectionally aligned graphite fibers.

In a report prepared by J. J. Brennan, "Program to Study SiC Fiber Reinforced Glass Matrix Composites", UTRC Annual Report R79-914401-2 (1979), matrix compositions from magnesium aluminosilicate as well as compositions of lithium aluminosilicate in combination with silicon carbide fibers were employed to prepare composites. Brennan reports that there were fabrication difficulties in this system due to lack of wetting and bonding between the fiber and matrix.

Finally, a NASA Contract Report, "Research on Graphite Reinforced Glass Matrix Composites," J. F. Bacom, et al. NTIS Report N79-11126 (1978), discloses a combination of graphite fibers and borosilicates glass to give composites.

All of these approaches to engineering materials require arduous hot-pressing techniques. The hot-pressing technique generally requires temperatures of greater than 1500° C. and pressures of 1000–5000 psi.

The present invention overcomes the disadvantages of the prior art methods because the composites of this invention prepared from carbon or silicon carbide fibers and silazane polymers, as described herein, require only a simple laminating process without using a hot-press technique. Further, composites with excellent physical properties can be obtained.

THE INVENTION

According to the present invention fiber reinforced glass composites can be obtained by firing a pressed and post-cured prepreg to an elevated temperature in an inert atmosphere such as argon, nitrogen, helium, or under a vacuum.

The fiber reinforced glass composites are prepared by a method which comprises
(A) impregnating high modulus fibers with a thermosetting silazane polymer dissolved in an organic solvent;
(B) forming a prepreg by drying the product from (A);
(C) pressing the dried product of (B) at an temperature not greater than about 300° C.;
(D) curing the pressed prepreg from (C) at a temperature not greater than about 300° C. for a time sufficient to insure complete or nearly complete cross-linking in the prepreg;
(E) slowly firing the pressed and cured prepreg from (D) to a temperature of at least 1000° C. in an inert atmosphere or vacuum until a fiber reinforced glass composite is obtained; and
(G) cooling the fiber reinforced glass composite.

For purposes of this invention, the fibers most useful herein are high modulus silicon carbide and carbon fibers. Examples of such fibers include carbon fibers containing 6000 filaments per tow or strand available from the Celanese Corporation, 86 Morris Avenue, Summit, N.J., U.S.A. under the trademark "Celion" and silicon carbide fibers available from Nippon Carbon Company, Ltd., Tokyo, Japan under the trademark "Nicalon". Naturally, other high modulus fibers, such as, for example, a alumina-boria-silica fiber available from Minnesota Minning and Manufacturing Company, St. Paul, Minn., U.S.A. under the tradename "Nextel 312" can be employed in this invention. It is preferred that the fibers used in the composites are essentially unidirectional and continuous fibers or woven fabrics. Unidirectional or woven fibers in the composite tend to lend greater strength to the composite. By "essentially unidirectional and continuous" it is meant that the fibers in the composite are generally in a parallel alignment and that the individual fibers extend through the composite in a generally unbroken manner. Generally, the fibers are treated prior to impregnation to remove any size or surface treatment used by the manufacturer. For example, the fibers can be subjected to an open flame treatment to burn the size away. Quite often, the fibers are soaked in solvents to remove such coatings. The fibers may be than pretreated to allow the silazane polymer solutions to wet the fibers much better. This treatment allows better adhesion of the matrix with the fibers of the composite which leads to better physical properties in the final composite product. Typically, the fibers are treated with organofunctional silanes or organo-functional silanes in conjunction with organic resins. These types of materials are known for use on glass cloth composites and the like. For example, 3-glycidoxypropyltrimethoxysilane (manufactured by Dow Corning Corporation, Midland, Mich., U.S.A.), alone or combined with a melamine resin, trademark Cymel 303, (manufactured by American Cyanamid, Wayne, N.J., U.S.A.) make excellent pretreatment for the fibers in this invention.

The silazane polymers useful in this invention must be of a thermosetting nature and also be capable of being transformed by heat into a ceramic material. By "thermosetting" it is meant that the silazane resin can be made to flow or soften upon the initial application of heat or heat and pressure but the silazane polymer solidifies or sets upon further heating via cross-linking in the polymer resin. The silazane polymers must also be capable of being converted into silicon, carbon, and nitrogen containing ceramic materials upon firing to temperatures of 1000° C. or more.

Silazane polymers especially useful in this invention are described in U.S. Pat. No. 4,312,970 (Jan. 26, 1982) and U.S. Pat. No. 4,340,619 (July 20, 1982) and U.S. patent application Ser. No. 304,446 (filed Sept. 21, 1981), all of which are hereby incorporated by reference.

The silazane polymers described in U.S. Pat. No. 4,312,970 are prepared by contacting and reacting in an inert, essentially anhydrous, atmosphere, an organochlorosilane or a mixture of organochlorosilanes of the general formula $$R_nSiCl_{4-n}$$

with a disilazane having the general formula $$(R_3'Si)_2NH$$

at a temperature in the range of 25° C. to 300° C. while distilling by-produced volatile products, wherein R is vinyl, an alkyl group of 1-3 carbon atoms or phenyl;

R' is vinyl, hydrogen, an alkyl group of 1-3 carbon atoms or phenyl; and n has a value of 1 or 2.

The organochloromonosilanes of U.S. Pat. No. 4,312,970 are those having the general formula $$R_nSiCl_{4-n}$$

where R is vinyl or an alkyl radical containing 1-3 carbon atoms or the phenyl group. Thus, those groups which are contemplated as being useful in this invention are methyl, ethyl, propyl, vinyl and phenyl.

The R groups can all be the same or they can be different. The organochloromonosilanes are common commodity chemicals and are commercially available and, therefore, an explanation as to their preparation does not appear to be necessary herein.

The value of n is 1 or 2. Thus, single organic group substituted silanes such as $CH_3SiCl_3$, $C_6H_5SiCl_3$, $CH_2=CHSiCl_3$, $CH_3CH_2SiCl_3$ or $CH_3(CH_2)_2SiCl_3$ and double organic substituted silanes such as $(CH_3)_2SiCl_2$, $(C_2H_5)_2SiCl_2$ and $(CH_2=CH)(CH_3)SiCl_2$ and the use of mixtures of such silanes, for example $CH_3SiCl_3$ and $(CH_3)_2SiCl_2$ can be used. It is preferred that when organochlorosilane mixtures are used, the number of units of diorgano-substituted silicon atoms should not exceed the number of units of monoorgano-substituted silicon atoms.

The silazane polymers of U.S. Pat. No. 4,340,619, which are the preferred silazane polymers for the practice of this invention, are prepared by contacting and reacting in an inert, essentially anhydrous, atmosphere, a chlorine-containing disilane or a mixture of chlorine-containing disilanes, of the general formula $$(Cl_aR_bSi)_2$$

with a disilazane having the general formula $$(R_3'Si)_2NH$$

at a temperature in the range of 25° C. to 300° C. while distilling by-produced volatile products, wherein R is vinyl, an alkyl group of 1-3 carbon atoms or the phenyl group;

R' is vinyl, hydrogen, an alkyl group of 1-3 carbon atoms or the phenyl group;

a has a value of 0.5-3;

b has a value of 0-2.5 and the sum of a+b is equal to three.

The chlorine-containing disilanes of U.S. Pat. No. 4,340,619 are those disilanes having the general formula $$(Cl_aR_bSi)_2$$

where R is vinyl, an alkyl radical containing 1-3 carbon atoms or the phenyl group. Thus, the R groups are methyl, ethyl, propyl, vinyl and phenyl. The R groups can all be the same or they can be different. The chlorine-containing disilanes can be those found in the residue from the Direct Process for producing halosilanes (Eaborn, C., "Organosilicon Compounds", Butterworth Scientific Publications, London, 1960, pg. 1). The Direct Process is the reaction between silicon metal and aliphatic halides, generally methyl chloride, at elevated temperature in the presence of catalyst, generally copper, to produce chlorosilanes.

For the chlorine-containing disilanes described above, the value of a and b is from 0.5-3 and 0-2.5 respectively, and the sum of a+b is equal to three. Examples of chlorine-containing disilanes are $[Cl(CH_3)_2Si]_2$, $[Cl_2CH_3Si]_2$, $[Cl_2C_2H_5Si]_2$, $[Cl(C_6H_5)_2Si]_2$ and $[Cl_2CH_2=CHSi]_2$.

Monosilanes can also be used in admixtures with the above described chlorine-containing disilanes. Examples include $CH_3SiCl_3$, $(CH_3)_2SiCl_2$, $H(CH_3)_2SiCl$, $(CH_3)_3SiCl$, $(CH_2=CH)(CH_3)_2SiCl$, $(C_2H_5)_2SiCl_2$, $C_6H_5SiCl_3$, as well as $(C_6H_5)_2SiCl_2$, and $(C_6H_5)_3SiCl$.

When polysilazanes polymers are prepared in accordance with U.S. Pat. No. 4,340,619 for use in this invention it is preferred that mixtures of chlorine-containing disilanes be employed where the number of units of diorgano-substituted silicon atoms does not exceed the number of units of monoorgano-substituted silicon atoms.

The second reactant in both U.S. Pat. No. 4,312,970 and U.S. Pat. No. 4,340,619 is a disilazane of the general formula $(R_3'Si)_2NH$. R' is in this formula is vinyl, hydrogen, an alkyl radical of 1-3 carbon atoms or the phenyl group. Therefore, R', for purposes of this formula is represented by hydrogen, methyl, ethyl, propyl, vinyl and phenyl. Each R' group in this formula can be the same or they can be different. Examples of the disilazanes include:

[(CH_3)_3Si]_2NH, [C_6H_5(CH_3)_2Si]_2NH,

[(C_6H_5)_2CH_3Si]_2NH, [CH_2=CH(CH_3)_2Si]_2NH,

[CH_2=CH(CH_3)C_6H_5Si]_2NH,

[CH_2=CH(C_6H_5)_2Si]_2NH,

[CH_2=CH(C_2H_5)_2Si]_2NH, [H(CH_3)_2Si]_2NH and

[CH_2=CH(C_6H_5)C_2H_5Si]_2NH.

These reactants are brought together in an inert, essentially anhydrous atmosphere. By "inert" we mean that the reaction is carried out under a blanket of inert gas, such as argon, nitrogen, or helium. What we mean by "essentially anhydrous" is that the reaction is preferably carried out in an absolutely anhydrous atmosphere but minute amounts of moisture can be tolerated.

When the reactants are contacted with each other, as described in U.S. Pat. Nos. 4,312,970 and 4,340,619, the reaction begins which forms an intermediate amino compound. Upon heating, additional amino compound is formed and upon continued heating, $R_3'SiCl$ is distilled from the reaction mixture and a silylsilazane polymer is formed. The order of addition of the materials does not appear to be critical. As the temperature is raised higher, more condensation takes place and crosslinking occurs with residual R₃'Si— that is not distilled from the mixture acting as a chain-stopper. This control allows one to stop the reaction at any point to obtain almost any desired viscosity. The desirable temperature range for this reaction is 25° C. to 300° C. A preferred temperature range for this reaction is 125°-300° C. The length of time that the reaction requires depends on the temperature employed and the viscosity one wishes to achieve.

What is meant by "volatile products" are the distillable by-produced products that are formed by the reactions set forth above. These materials can be represented by $(CH_3)_3SiCl$, $(CH_2=CH)(C_6H_5)_2SiCl$, $CH_3(C_6H_5)_2SiCl$, $(CH_3)_2C_6H_5SiCl$ and $(CH_2=CH)(CH_3)_2SiCl$. Sometimes, the process requires the use of a vacuum along with the heat in order to remove these materials from the reaction mixture.

The silazane polymers described in application Ser. No. 304,446 are prepared by contacting and reacting in an inert, essentially anhydrous, atmosphere at a temperature in the range of 25° C. to 370° C.
(A) ammonia and
(B) chlorine-containing disilanes selected from the group consisting of
 (i) a chlorine-containing disilane having the general formula $[Cl_cR_dSi]_2$ 

and
 (ii) a mixture of chlorine-containing disilanes having the general formula $[Cl_eR_fSi]_2$ 

wherein
 c has a value of 1.5-2.0;
 d has a value of 1.0-1.5; the sum of c+d is equal to three; the ratio of e to f is in the range of 1.1 to 2.1;
 the sum of e+f is equal to three; and
 R in each case is selected from a group consisting of the vinyl group, an alkyl radical of 1-3 carbon atoms and the phenyl group.

The chlorine-containing disilanes of application Ser. No. 304,446 are those disilanes having the general formulae (i) $(Cl_cR_dSi)_2$ and (ii) $(Cl_eR_fSi)_2$.

In these formulae, R is vinyl, an alkyl radical containing 1-3 carbon atoms or the phenyl group. Thus, the R groups are methyl, ethyl, propyl, vinyl and phenyl. The R groups can all be the same or they can be different. These chlorine-containing disilanes can also be those found in the residue from the Direct Process for producing halosilanes.

The chlorine-containing disilanes in application Ser. No. 304,446 having the formula (i) above have values of c and d from 1.5-2.0 and 1.0-1.5, respectively, and the sum of c+d is equal to three. Examples of chlorine-containing disilanes are $(Cl_2C_6H_5Si)_2$, $(Cl_2CH_3Si)_2$, $(Cl_2C_2H_5Si)_2$, $(Cl_2CH_2=CHSi)_2$ and $(CH_3)_2ClSiSiCl_2CH_3$. Mixture of chlorine-containing disilanes having the formula (ii) above have the ratio of e to f in the range of 1:1 to 2:1 and the sum of e+f is three. Examples of such chlorine-containing disilanes are those just set forth above and in addition such disilanes as $(Cl_3Si)_2$, $(CH_3)_3SiSi(CH_3)_2Cl$, $[(CH_3)_2ClSi]_2$, $[(C_6H_5)(CH_3)ClSi]_2$ and $[(CH_2=CH)CH_3ClSi]_2$.

The other reactant employed in the process of application Ser. No. 304,446 is ammonia and because of the anhydrous nature of the process, it is required that the ammonia used be essentially anhydrous.

The disilanes and ammonia reactants of application Ser. No. 304,446 are brought together in an inert, essentially anhydrous atmosphere. It appears that when the reactants are contacted with each other, the reaction begins which forms a transient intermediate disilane amino compound and NH₄Cl, i.e.

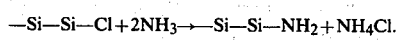

The order of addition of the materials does not appear to be critical. The initial reaction is manifested by the appearance of the white flocculent precipitated NH₄Cl. NH₄Cl tends to increase the viscosity of the reaction mass and therefore, it is desirable to add a low boiling solvent to disperse the NH₄Cl and allow more uniform stirring of the reaction mixture. The low boiling solvent should be any dry organic solvent boiling below about 100° C. such as pentane, heptane, hexane, benzene and the like. The reaction begins when the ingredients are contacted. The reaction can be carried out at room temperature but in order to hasten the reaction, however, it is best to heat the reaction mass to a gentle reflux. Occasionally, depending on the ingredients being used, it may be necessary to stop the reaction and filter the NH₄Cl from the reaction mixture. This is especially true if no solvent is used. Occasionally, the reaction mixture may need to be filtered more than once to obtain a clear filtrate. Also, one may desire to filter the reaction mixture, heat the filtrate for a continuation of the reaction and then, refilter to obtain a clear filtrate. This interim stage of the reaction scheme results in low molecular weight materials. The reaction is continued until equilibrium is reached. Equilibrium is established when no more NH₄Cl is formed on continued heating. The material is then filtered and the filtrate is returned to the reaction vessel and heated to reflux, if desired, for an additional period of time. The solvent is removed by distillation and the residue is then heated to higher temperatures to form the polymeric product.

As the temperature is raised higher, more condensation takes place and crosslinking occurs. When the reaction is cooled, the condensation and crosslinking slow down or cease. This control allows one to stop the reaction at any point to obtain almost any desired viscosity. The desirable temperature range of this reaction is 25° C. to 370° C. The most preferred range is 125° C. to 300° C. The length of time that the reaction requires depends on the temperature and the viscosity one wishes to achieve.

The reader is referred to U.S. Pat. Nos. 4,312,970 and 4,340,619 and U.S. patent application Ser. No. 304,446 for more details in the preparation of the silazane polymers useful in this present invention. As one skilled in the art would know, mixtures of polysilazanes prepared from the various synthetic procedures described herein can be employed in this invention. Further, the various synthetic methods may be combined to produce silazane polymers. For example, mixtures of chloromonosilanes and chlorodisilanes can be reacted with various disilazanes to produce silazane polymers useful in this invention.

The silazane polymers useful in this invention will, in general, be solid materials or high viscosity liquids at ambient temperature. Thus it will be required that such polymers first be dissolved in an organic solvent prior to impregnating the high modulus fibers. Suitable solvents include the aliphatic and aromatic hydrocarbons. It is preferred that the solvent have a boiling point of less than about 125° C. at atmospheric pressure so that the drying of the impregnated fiber bundle can be carried out more easily. Preferred solvents include hexane, heptane, benzene and toluene. The solvent should be essentially water free by which is meant that the water content of the solvent should be less than about one percent by weight. Preferably the solvent should contain only a trace or less of water. The amount of silazane polymer in solution can be varied over a wide range. The concentration of the silazane polymer in solution can be varied to effect the amount of silazane polymer that will impregnate the fiber bundle. In other words, the silazane polymer concentration can be varied to obtain various fiber volume percentages in the final, fired composite. Generally, 20 to 60 weight percent solutions of the silazane polymer are employed. The solutions can be filtered or centrifuged, if desired, to remove any insoluble materials.

The silazane resins employed in this present invention may also contain conventional fillers if desired. Examples of such fillers include $Al_2O_3$, $SiO_2$, other metallic oxides, SiC and $Si_3N_4$ powders and the like.

The desired fiber is impregnated with the polysilazane solution by any convenient means. The fiber may, if desired, be cleaned of sizing or other surface treatments as described above prior to impregnation. The strands of fiber or the woven fabric can be immersed in the solution and drained of excess solution. The fibers can be wound on drums or spools and wetted with the polysilazane solution. Other impregnation methods may be used.

Generally, it is advantageous to treat the fibers before impregnating them in order to enhance the adhesion of the matrix material to the fibers. As mentioned above, this is easily accomplished by treating the fibers with known adhesion promoting materials such as are common in the glass composite industry. After the fibers are treated in this manner, they are air dried and impregnated with the silazane polymer solution.

After the excess material has drained from the fibers, the product is dried. This is easily accomplished by allowing the impregnated fiber to stand at room temperature. The dried, impregnated fibers are commonly referred to as a "prepreg".

The dried, impregnated fiber is then pressed at a temperature of less than 300° C. Care should be taken to avoid exposing the dried, impregnated fiber bundle to elevated temperatures prior to the pressing step as the flowability of the matrix material in the mold can be significantly reduced by elevated temperatures. This pressing step forms the composite into the desired shape and causes uniformity of the resin matrix around the fibers. The pressing takes place at a temperature of about 100° to 300° C. for a few minutes to several hours. The externally applied pressure is on the order of a few pounds per square inch to 2500 psi. The temperature, time duration, and pressure should be selected so that the resin will flow throughout the mold. It has been found that pressing at about 175° C. for one-half hour at a pressure of about 2000 psi generally gives satisfactory results. Pressures lower than about 1000 psi also give satisfactory results. Care should be taken to avoid temperatures and pressures such that the resin is forced out of the mold. In general, the actual pressure is not a critical parameter in the pressing step.

The pressed composite is then further cured at a temperature not greater than 300° C. to insure complete or nearly complete cross-linking in a post curing step. A preferred schedule for post-curing has been found to be about 8 hours at 100° C. followed by 16 hours at 250° C. Other post-curing schedules can be used so long as the composite undergoes nearly complete or complete cross-linking and the temperature does not exceed 300° C. This post-curing can take place either in the mold with applied pressure or in a conventional oven or similar device without any applied pressure.

The pressed and cured product (the green composite) is then slowly fired in a furnace to a temperature of at least 1000° C. in an inert atmosphere or vacuum until the product ceramifies. Silicon carbide fiber containing composites can also be prepared by firing in air at elevated temperatures until the product ceramifies. It is preferred that all fringes be under an inert atmosphere or vacuum. It is preferred that the green composite be fired at a temperature of about 1200° C. By slow firing, it is meant that the composites are heated in a slow, stepwise fashion until the majority of any higher boiling volatiles present escape the composite after which time the temperature can be quickly raised to the ultimate firing temperature. For example, the temperature for most composites should be raised to about 300° C. and the heating slowly continued until a temperature of about 600° C. is reached and then the temperature can be raised rather quickly to the ultimate firing temperature. The effect that needs to be accomplished is the removal of the greater portion of any volatiles that are in the composite. For most composites, this occurs over about a 300° C. heating range and for the majority of composites prepared from the silazane polymers of this process, this range is 300° C. to 600° C. In order to establish the range for any given formulation, one can run a thermogravimetric analysis on the material to determine the temperature range at which the majority of volatiles are removed.

After completion of the firing process the composite is cooled. At least the initial cooling should also be under an inert atmosphere or vacuum. Composites made with silicon carbide fibers can, if desired, be cooled under an air atmosphere. When cooled, the resulting material is a uniform, hard, strong fiber reinforced glass composite. The composites of this invention can have the volume percentage of fibers in the composites varying over a wide range depending upon the desired use. For most composites it is preferred that the composites have between 30 and 50 volume percent fibers.

Also contemplated within the scope of this invention is the repeat of steps A, B, D, E, and F of this invention on the already formed and fired fiber reinforced glass composites of this invention. Thus, it is within the scope of this invention to obtain a fiber reinforced composite from steps A through F of this invention and subject the fired composite to re-impregnation, drying, curing and firing. This repetition on an already fired composite allows one to raise the density (and consequently the physical strength) of the final composite. It is within the scope of this invention to repeat the steps A, B, D, E, and F, for a fired composite, multiple times in order to reach a high density, high strength product.

The following examples are intended to illustrate the invention and should not be construed to limit the claims as set forth herein.

Test Procedures

Modulus of Rupture (MOR): The modulus of rupture or flexural strength was determined using ASTM D-790 procedure. Flexural test speciments were approximately 6.5 cm×1.0 cm×0.15 cm with specimen length parallel to the fiber axis. Load versus crosshead travel was measured in a three-point bending mode on a universal testing machine manufactured by the Instron Corporation, Canton, Mass. United States. The machine had 3/8 in. diameter sapphire loading pins at a span of 2 in. The loading rate was 0.2 in./min. The span to thickness ratio (S/T, where S is the span used in the testing machine and T is the thickness of tested sampled) was generally between 20 and 40.

EXAMPLE 1

A silazane polymer was prepared by reacting methylchlorodisilanes with hexamethyldisilazane using the following procedure. The reactor was a 72 liter stainless steel, agitated, electrically heated vessel. By-produced volatile products are removed from the system through a water scrubber system. The source of methylchlorodisilanes was from a residue from the Direct Process for producing methylchlorosilanes from the reaction of Si metal and methyl chloride. The distilled residue contained about 88 weight percent disilanes. The disilanes consisted of $(CH_3)_2ClSiSiCl(CH_3)_2$, 10.8 weight percent; $CH_3Cl_2SiSiCl(CH_3)_2$, 40.7 weight percent; and $CH_3Cl_2SiSiCl_2CH_3$, 48.5 weight percent as determined by a gas-liquid chromatographic technique.

The reactor was first purged with nitrogen gas; a nitrogen purge was continued throughout the reaction. The reaction was charged with 26 pounds of the above described methylchlorodisilanes (1.0 equivalent of Cl) and 43.4 pounds of hexamethyldisilazane (0.75 equivalents). The agitated charge was heated to 195° C. at a rate of 1.1° C./min. The temperature was held at 195° C. for thirty minutes. The hot, molten silazane polymer was poured into a stainless steel pan under a nitrogen atmosphere and allowed to cool. Solid silazane polymer was stored under nitrogen until used. The softening point of the silazane polymer was 83° C.

A 50 percent by weight polysilazane solution in toluene was prepared. A few drops of a silicone glycol surfactant of general formula

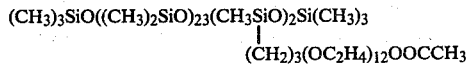

was added to the polysilazane solution to improve wetability of the fibers.

Celanese Celion carbon fibers (6000 filaments per tow or strand) were used as received as these fibers were unsized. The individual carbon fibers had an average diameter of about 7 microns. Each individual carbon strand was impregnated by passing the strand through the polysilazane solution. After drying to a tack-free state the strands were wrapped around a 6×6 inch metal plate in such a manner that the resulting bundle was about ½ inch wide with a thickness of about ⅛ to ¼ inch. The bundles were then cut into about 3 inch lengths and placed in a mold for pressing. The stainless steel mold was about 3×5 inches with an internal cavity of about 3×0.5 inches. The top of the mold is a stainless steel plunger which fits inside the external cavity. A bundle of fiber was pressed at 175° C. for 30 minutes with a 2000 psi pressure. The final thickness of the prepreg generally depends on the amount of matrix and fibers used and the applied pressure.

The pressed prepreg was then post-cured at 100° C. for eight hours and then 250° C. for sixteen hours. This material was then fired in an Astro Industries water cooled graphite resistance furnace (Model 1000.3060-FP-12) to 1200° C. under a nitrogen atmosphere. The sample was heated from 200° to 800° C. at a rate of about 2° C. per minute and from 800° to 1200° C. at a rate of about 20° C. per minute. The composite was held at 1200° for 12 minutes. The total firing time was about 5.5 hours. A total of 4 samples were prepared by this just described procedure with the following results:

| Sample | Bulk density (g/cm³) | Volume Percent Fibers | S/T | Flexural Strength (psi) |
|---|---|---|---|---|
| 1 | 1.25 | 45 | 21 | 10,543 |
| 2 | 1.24 | 41 | 20 | 8,454 |
| 3 | 1.15 | 36 | 30 | 8,185 |
| 4 | 1.23 | 35 | 31 | 7,135 |

EXAMPLE 2

A fiber reinforced glass composite was prepared using the same carbon fiber as used in Example 1. The fiber was impregnated with the silazane solution of Example 1 to which none of the silicone glycol surfactant had been added. The same procedure was employed as described in Example 1 except for the actual firing of the green composite. Three samples of the green composite were fired to 1100° C. in an argon atmosphere in a Lindberg (Watertown, Wis.) three zone tube furnace (Series 5400). The composite was heated from 200° to 600° C. at a rate of 3.3° C. per minute, from 600° to 750° at 2.5° C. per minute, and from 750° to 1100° C. at 5.8° C. per minute. The composites were held at 1100° C. for 30 minutes for a total firing time of about 4.5 hours. Carbon fiber reinforced composites were obtained with the following properties:

| Sample | Bulk density (g/cm³) | Volume Percent Fibers | S/T | Flexural Strength (psi) |
|---|---|---|---|---|
| 1 | 1.00 | 40 | 35 | 10,472 |
| 2 | 1.12 | 29 | 36 | 8,482 |
| 3 | 0.80 | 23 | 22 | 7,759 |

EXAMPLE 3

A fiber reinforced glass composite was prepared from a silazane resin and carbon fibers as described in Example 1. The silazane resin was however dissolved, at 50 weight percent, in hexane to which a few drops of the same silicone glycol surfactant was added. The procedure for making the composite was the same as described in Example 2.

| Sample | Bulk density (g/cm³) | Volume Percent Fibers | S/T | Flexural Strength (psi) |
|---|---|---|---|---|
| 1 | 1.19 | 48 | 38 | 11,828 |
| 2 | 1.02 | 36 | 32 | 7,661 |

EXAMPLE 4

This example shows the use of a woven fabric to make fiber reinforced glass composites. A carbon fabric (A-193P) from Hercules Incorporated, Magna, Utah, United States was employed. This carbon fabric had an epoxy finish but was used as received. The fabric was dipped into a 50 percent by weight solution of the silazane polymer of Example 1 in toluene. After drying overnight at room temperature samples of the impregnated fabric were cut to fit the mold. Except as noted, the procedures of Example 1 were employed. Four layers of the dried impregnated fabric were used for preparing the composite. The dried impregnated fabric sample was pressed at 135° C. for 5 minutes under a pressure of only a few psi. The initial pressure was from the weight of the top portion (plunger) of the mold. The pressure was slowly increased to 2000 psi with a total time of 30 minutes in the press. The pressed prepreg was post cured at 100° C. for 8 hours and 250° C. for 16 hours. The sample was fired in nitrogen as described in Example 1. The fired composite contained about 70 percent by weight fiber and had a flexural strength of 4445 psi (S/T=54).

EXAMPLE 5

This example shows composites prepared by reimpregnating and firing a carbon fabric reinforced composite. The same carbon fabric as described in Example 4 was employed except the finish was removed by heating the fabric to 600° C. for ten minutes. The carbon fabric was then treated by soaking in a toluene solution containing 0.05 weight percent of 3-glycidoxypropyltrimethoxysilane and 0.95 weight percent of Cymel 303 for 15 minutes. After air drying, the fabric was soaked for 15 minutes in the same polysilazane (50 percent by weight) solution in toluene, to which was added a few drops of a silicone glycol surfactant, as described in Example 1. The impregnated fabric was air dried for several hours. The fabric was cut into 3.75 by 3.75 inch pieces and stored overnight in a dessicator at ambient temperature. Eight layers of fabric, one atop the other, were pressed in a stainless steel 4×4 inch flat-plate mold at 175° C. and 100 psi for thirty minutes. The pressed prepreg was post cured at 175° C. for 16 hours. The pressed and cured prepreg was cut into 1 by 3 inch pieces and then fired to 1200° C. in argon using the tube furnace and procedures as described in Example 2. The total firing time was about 5.2 hours.

The fired composite was reimpregnated by soaking for 30 minutes in the same impregnating solution as originally used. The reimpregnated sample was air dried for one hour and cured at 100° C. for one hour. The entire reimpregnating procedure was repeated once more. The twice reimpregnated sample was stored overnight at room temperature and then fired to 1200° C. in argon as before. The fired composite was then impregnated once more in the same manner as the first reimpregnation and again fired to 1200° C. in argon as before.

The final composite, which had been fired for a total of three times, was evaluated. The final composite had a bulk density of 1.3 g/cm³, contained 26 percent by volume fiber, and had a flexural strength of 3360 psi (S/T=16).

EXAMPLE 6

This example shows the use of silicon carbide fibers in preparing composites. This example also shows the firing of the pressed and cured prepreg under various atmospheres. Nicalon silicon carbide fibers from Nippon Carbon were employed. These fibers had an average diameter of 10 to 15 microns. A bundle of SiC fibers was prepared by wrapping the fibers around a 25 inch span 60 times.

The epoxy sizing on the fibers was removed, first by soaking the fiber bundle in acetone for three hours and then drying and heat treating the bundle by passing the bundle through a Bunsen burner flame until the fibers appeared fluffy. The bundle was then soaked in a toluene solution containing 0.05 weight percent of 3-glycidoxypropyltrimethoxysilane and 0.95 weight percent of Cymel 303. The fibers were than air-dried two hours at room temperature. After cooling, the bundle was then soaked for 15 minutes in a 50 percent by weight silazane solution in toluene as described in Example 1 to which had been added a few drops of the silicone glycol surfactant described in Example 1. The bundle was allowed to air dry to a tack free state. This provided a dried handleable fiber bundle. The bundle of fibers was then pressed in a stainless steel mold (as described in Example 1) at 175° C. for 30 minutes under a pressure of 2000 psi. The pressed prepreg was then post-cured at 100° C. for eight hours and then 250° C. for sixteen hours. Samples were then fired to 1250° C. under either a helium, nitrogen, or argon atmosphere using the Astro furnace and firing conditions described in Example 1.

| Atmosphere | Bulk Density (g/cm³) | Volume Percent Fibers | S/T | Flexural Strength (psi) |
|---|---|---|---|---|
| He | 1.16 | 23 | 30 | 4465 |
| He | 1.24 | 35 | 27 | 4097 |
| N₂ | 1.40 | 29 | 33 | 5379 |
| N₂ | 1.32 | 28 | 25 | 3337 |
| Ar | 1.34 | 29 | 31 | 4894 |
| Ar | 1.75 | 39 | 25 | 4382 |
| Ar | 1.43 | 30 | 29 | 5502 |
| Ar | 1.36 | 28 | 31 | 6079 |

Samples of the same pressed and cured prepreg were also fired to 1100° C. in air using the Lindberg tube furnace and firing conditions described in Example 2.

| Sample | Bulk density (g/cm³) | Volume Percent Fibers | S/T | Flexural Strength (psi) |
|---|---|---|---|---|
| 1 | 1.21 | 26 | 28 | 4303 |
| 2 | 1.34 | 26 | 36 | 5930 |
| 3 | 1.27 | 25 | 26 | 4062 |

Composites prepared with silicon carbide fibers, as described in this Example, showed excellent oxidation resistance. For example, silicon carbide fiber composites showed virtually no change in flexural strength upon exposure to still air at about 1100° C. for 12.5 hours. The samples showed a weight gain of about 0.2 to 1.0 percent during the oxidation tests.

EXAMPLE 7

This example shows composites prepared by reimpregnating and firing a silicon carbide fiber reinforced composite. First a composite was prepared by the procedure given in Example 6 except that the initial impregnation was done using a 30 weight percent silazane polymer in toluene solution and the pressed sample was post-cured at 175° C. for 16 hours. The pressed and cured prepreg was fired at 1200° C. under nitrogen using the Astro furnace. The fired composite was then placed in a vacuum chamber. After pulling a vacuum, a 10 weight percent silazane polymer solution in toluene (the same silazane polymer used in the first impregnation) was added to cover the fired composite. The pressure was slowly increased to atmospheric pressure by releasing the vacuum. The impregnated composite was then air dried and cured at 100° C. for 30 minutes and 150° C. for 30 minutes. This impregnation and curing procedure was then repeated two and one more times, respectively. After the final reimpregnation procedure the composite was post cured at 175° C. for 16 hours. The sample was then fired at 1200° C. under nitrogen. The reimpregnation, curing, post-curing, and firing was then repeated such that the final composite was fired a total of four times. This final composite had a 8.0 weight percent increase over a control which was impregnated and fired only once under similar experimental conditions.

| Sample | Number of Firings | Fiber Volume Percent | S/T | Flexural Strength (psi) |
|---|---|---|---|---|
| Control | 1 | 66 | 24 | 12,101 |
| Reimpregnated | 4 | 61 | 30 | 22,708 |

That which is claimed is:
1. A method of preparing fiber reinforced glass composites which method comprises,
(A) impregnating high modulus fibers with a thermosetting silazane polymer dissolved in an organic solvent;
(B) forming a prepreg by drying the product from (A);
(C) pressing the dried product of (B) at an temperature not greater than about 300° C.;
(D) curing the pressed prepreg from (C) at a temperature not greater than about 300° C. for a time sufficient to insure complete or nearly complete crosslinking in the prepreg;
(E) slowly firing the pressed and cured prepreg from (D) to a temperature of at least 1000° C. in an inert atmosphere or vacuum until a fiber reinforced glass composite is obtained; and
(F) cooling the fiber reinforced glass composite.
2. A method as described in claim 1 wherein said silazane polymer is prepared by contacting and reacting in an inert, essentially anhydrous, atmosphere, a chlorine-containing disilane or a mixture of chlorine-containing disilanes, of the general formula $(Cl_aR_bSi)_2$ with a disilazane having the general formula $(R_3'Si)_2NH$ at a temperature in the range of 25° C. to 300° C. while distilling by-produced volatile products, wherein
R is vinyl, an alkyl group of 1-3 carbon atoms or the phenyl group;
R' is vinyl, hydrogen, an alkyl group of 1-3 carbon atoms or the phenyl group;
a has a value of 0.5-3;
b has a value of 0-2.5 and the sum of a+b is equal to three.
3. A method as described in claim 1 wherein said silazane polymer is prepared by contacting and reacting in an inert, essentially anhydrous, atmosphere, an organochlorosilane or a mixture of organochlorosilanes of the general formula $R_nSiCl_{4-n}$ with a disilazane having the general formula $(R_3'Si)_2NH$ at a temperature in the range of 25° C. to 300° C. while distilling by-produced volatile products, wherein
R is vinyl, an alkyl group of 1-3 carbon atoms or phenyl;
R' is vinyl, hydrogen, an alkyl group of 1-3 carbon atoms or phenyl; and
n has a value of 1 or 2.
4. A method as described in claim 1 wherein said silazane polymer is prepared by contacting and reacting in an inert, essentially anhydrous, atmosphere, at a temperature in the range of 25° C. to 370° C.
(A) ammonia and
(B) chlorine-containing disilanes selected from the group consisting of
(i) a chlorine-containing disilane having the general formula $[Cl_cR_dSi]_2$ and
(ii) a mixture of chlorine-containing disilanes having the general formula $[Cl_eR_fSi]_2$ wherein
c has a value of 1.5-2.0;
d has a value of 1.0-1.5;
the sum of c+d is equal to three;
the ratio of e to f is in the range of 1.1 to 2.1;
the sum of e+f is equal to three; and
R in each case is selected from a group consisting of the vinyl group, and alkyl radical of 1-3 carbon atoms and the phenyl group.
5. A method as described in claim 2 wherein said silazane polymer is prepared by contacting and reacting in an inert, essentially anhydrous, atmosphere, a chlorine-containing disilane or a mixture of chlorine-containing disilanes, wherein the number of diorgano-substituted silicon atoms does not exceed the number of monoorgano-substituted silicon atoms, of the general formula $(Cl_aR_bSi)_2$ with a disilazane having the general formula $(R_3'Si)_2NH$ at a temperature in the range of 125° C. to 300° C. while distilling by-produced volatile products, wherein R is vinyl, an alkyl group of 1-3 carbon atoms or phenyl group;

R' is vinyl, hydrogen, an alkyl group of 1-3 carbon atoms or the phenyl group;

a has a value of 0.5-3;

b has a value of 0-2.5 and the sum of a+b is equal to three.

6. A method as described in claim 3 wherein said silazane polymer is prepared by contacting and reacting in an inert, essentially anhydrous, atmosphere, an organochlorosilane or a mixture of organochlorosilanes, wherein for said mixture the number of diorgano-substituted silicon atoms does not exceed the number of monoorgano-substituted silicon atoms, of the general formula $R_n SiCl_{4-n}$ with a disilazane having the general formula $(R_3'Si)_2NH$ at a temperature in the range of 125° C. to 300° C. while distilling by-produced volatile products, wherein R is vinyl, an alkyl group of 1-3 carbon atoms or phenyl;

R' is vinyl, hydrogen, an alkyl group of 1-3 carbon atoms or phenyl; and n has a value of 1 or 2.

7. A method as described in claim 4 wherein said silazane polymer is prepared by contacting and reacting in an inert, essentially anhydrous, atmosphere at a temperature in the range of 25° C. to 370° C.

(A) ammonia and (B) chlorine-containing disilanes selected from the group consisting of (i) a chlorine-containing disilane having the general formula $[Cl_c R_d Si]_2$ and (ii) a mixture of chlorine-containing disilanes having the general formula $[Cl_e R_f Si]_2$ wherein c has a value of 1.5-2.0;

d has a value of 1.0-1.5;

the sum of c+d is equal to three;

the ratio of e to f is in the range of 1.1 to 2.1;

the sum of e+f is equal to three; and

R in each case is selected from a group consisting of the vinyl group, and alkyl radical of 1-3 carbon atoms and the phenyl group; and wherein the number of diorgano-substituted silicon atoms in the mixture of chlorine-containing disilanes does not exceed the number of monoorgano-substituted silicon atoms.

8. A method as described in claim 1 wherein said high modulus fibers are selected from the group consisting of carbon fibers and silicon carbide fibers and wherein said high modulus fibers are essentially undirectional and continuous.

9. A method as described in claim 2 wherein said high modulus fibers are selected from the group consisting of carbon fibers and silicon carbide fibers and wherein said high modulus fibers are essentially undirectional and continuous.

10. A method as described in claim 3 wherein said high modulus fibers are selected from the group consisting of carbon fibers and silicon carbide fibers and wherein said high modulus fibers are essentially undirectional and continuous.

11. A method as described in claim 4 wherein said high modulus fibers are selected from the group consisting of carbon fibers and silicon carbide fibers and wherein said high modulus fibers are essentially undirectional and continuous.

12. A method as described in claim 5 wherein said high modulus fibers are selected from the group consisting of carbon fibers and silicon carbide fibers and wherein said high modulus fibers are essentially undirectional and continuous.

13. A method as described in claim 6 wherein said high modulus fibers are selected from the group consisting of carbon fibers and silicon carbide fibers and wherein said high modulus fibers are essentially undirectional and continuous.

14. A method as described in claim 7 wherein said high modulus fibers are selected from the group consisting of carbon fibers and silicon carbide fibers and wherein said high modulus fibers are essentially undirectional and continuous.

15. A method as described in claim 1 wherein said high modulus fibers are selected from the group consisting of carbon fibers and silicon carbide fibers and wherein said high modulus fibers form a woven fabric.

16. A method as described in claim 2 wherein said high modulus fibers are selected from the group consisting of carbon fibers and silicon carbide fibers and wherein said high modulus fibers form a woven fabric.

17. A method as described in claim 3 wherein said high modulus fibers are selected from the group consisting of carbon fibers and silicon carbide fibers and wherein said high modulus fibers form a woven fabric.

18. A method as described in claim 4 wherein said high modulus fibers are selected from the group consisting of carbon fibers and silicon carbide fibers and wherein said high modulus fibers form a woven fabric.

19. A method as described in claim 5 wherein said high modulus fibers are selected from the group consisting of carbon fibers and silicon carbide fibers and wherein said high modulus fibers form a woven fabric.

20. A method as described in claim 6 wherein said high modulus fibers are selected from the group consisting of carbon fibers and silicon carbide fibers and wherein said high modulus fibers form a woven fabric.

21. A method as described in claim 7 wherein said high modulus fibers are selected from the group consisting of carbon fibers and silicon carbide fibers and wherein said high modulus fibers form a woven fabric.

22. A method as described in claim 1 wherein the prepreg of step (B) pressed in step (C) at a temperature of 100° to 300° C.

23. A method as described in claim 5 wherein the prepreg of step (D) pressed in step (C) at a temperature of 100° to 300° C.

24. A method as described in claim 6 wherein the prepreg of step (D) pressed in step (C) at a temperature of 100° to 300° C.

25. A method as described in claim 7 wherein the prepreg of step (D) pressed in step (C) at a temperature of 100° to 300° C.

26. A method as described in claim 12 wherein the prepreg of step (D) pressed in step (C) at a temperature of 100° to 300° C.

27. A method as described in claim 13 wherein the prepreg of step (D) pressed in step (C) at a temperature of 100° to 300° C.

28. A method as described in claim 14 wherein the prepreg of step (D) pressed in step (C) at a temperature of 100° to 300° C.

29. A method as described in claim 19 wherein the prepreg of step (D) pressed in step (C) at a temperature of 100° to 300° C.

30. A method as described in claim 20 wherein the prepreg of step (D) pressed in step (C) at a temperature of 100° to 300° C.

31. A method as described in claim 21 wherein the prepreg of step (D) pressed in step (C) at a temperature of 100° to 300° C.

32. A process as described in claim 5 wherein said mixture of chlorine-containing disilanes is from the residue of the direct process and wherein in the general formula $(Cl_aR_bSi)_2$ and $(R_3'Si)_2NH$, both R and R' are methyl radicals.

33. A process as described in claim 12 wherein said mixture of chlorine-containing disilanes is from the residue of the direct process and wherein in the general formula $(Cl_aR_bSi)_2$ and $(R_3'Si)_2NH$, both R and R' are methyl radicals.

34. A process as described in claim 19 wherein said mixture of chlorine-containing disilanes is from the residue of the direct process and wherein in the general formula $(Cl_aR_bSi)_2$ and $(R_3'Si)_2NH$, both R and R' are methyl radicals.

35. A process as described in claim 23 wherein said mixture of chlorine-containing disilanes is from the residue of the direct process and wherein in the general formula $(Cl_aR_bSi)_2$ and $(R_3'Si)_2NH$, both R and R' are methyl radicals.

36. A process as described in claim 26 wherein said mixture of chlorine-containing disilanes is from the residue of the direct process and wherein in the general formula $(Cl_aR_bSi)_2$ and $(R_3'Si)_2NH$, both R and R' are methyl radicals.

37. A process as described in claim 29 wherein said mixture of chlorine-containing disilanes is from the residue of the direct process and wherein in the general formula $(Cl_aR_bSi)_2$ and $(R_3'Si)_2NH$, both R and R' are methyl radicals.

38. A method as described in claim 5 wherein the fiber reinforced glass composite of step (G) is subject to steps (A), (B), (D), (E), and (F) one or more times.

39. A method as described in claim 6 wherein the fiber reinforced glass composite of step (G) is subject to steps (A), (B), (D), (E), and (F) one or more times.

40. A method as described in claim 7 wherein the fiber reinforced glass composite of step (G) is subject to steps (A), (B), (D), (E), and (F) one or more times.

41. A fiber reinforced glass composite as prepared by the method of claim 5.

42. A fiber reinforced glass composite as prepared by the method of claim 6.

43. A fiber reinforced glass composite as prepared by the method of claim 7.

44. A fiber reinforced glass composite as prepared by the method of claim 12.

45. A fiber reinforced glass composite as prepared by the method of claim 13.

46. A fiber reinforced glass composite as prepared by the method of claim 14.

47. A fiber reinforced glass composite as prepared by the method of claim 19.

48. A fiber reinforced glass composite as prepared by the method of claim 20.

49. A fiber reinforced glass composite as prepared by the method of claim 21.

50. A fiber reinforced glass composite as prepared by the method of claim 29.

51. A fiber reinforced glass composite as prepared by the method of claim 30.

52. A fiber reinforced glass composite as prepared by the method of claim 31.

53. A fiber reinforced glass composite as prepared by the method of claim 32.

54. A fiber reinforced glass composite as prepared by the method of claim 37.

55. A fiber reinforced glass composite as prepared by the method of claim 38.

56. A fiber reinforced glass composite as prepared by the method of claim 39.

57. A fiber reinforced glass composite as prepared by the method of claim 40.

58. A method of preparing fiber reinforced glass composites, which method comprises,
(A) impregnating silicon carbide fibers with a thermosetting silazane polymer dissolved in an organic solvent;
(B) forming a prepreg by drying the product of (A);
(C) pressing the dried product of (B) at a temperature of 100° to 300° C.;
(D) curing the pressed prepreg from (C) at a temperature not greater than 300° C. for a time sufficient to insure complete or nearly complete cross-linking in the prepreg;
(E) slowly firing the pressed and cured prepreg from (D) to a temperature of at least 1000° C. in air until a fiber reinforced glass composite is obtained; and
(F) cooling the fiber reinforced glass composite.

59. A method as described in claim 58 wherein said silazane polymer is prepared by contacting and reacting in an inert, essentially anhydrous, atmosphere, a chlorine-containing disilane or a mixture of chlorine-containing disilanes, wherein the number of diorgano-substituted silicon atoms does not exceed the number of monoorgano-substituted silicon atoms, of the general formula $$(Cl_aR_bSi)_2$$

with a disilazane having the general formula $$(R_3'Si)_2NH$$

at a temperature in the range of 125° C. to 300° C. while distilling by-produced volatile products, wherein
R is vinyl, an alkyl group of 1–3 carbon atoms or the phenyl group;
R' is vinyl, hydrogen, an alkyl group of 1–3 carbon atoms or the phenyl group;
a has a value of 0.5–3;

b has a value of 0–2.5 and the sum of a+b is equal to three.

60. A method as described in claim 58 wherein said silazane polymer is prepared by contacting and reacting in an inert, essentially anhydrous, atmosphere, an organochlorosilane or a mixture of organochlorosilanes, wherein for said mixture the number of diorgano-substituted silicon atoms does not exceed the number of monoorgano-substituted silicon atoms, of the general formula $$R_n SiCl_{4-n}$$

with a disilazane having the general formula $$(R_3'Si)_2NH$$

at a temperature in the range of 125° C. to 300° C. while distilling by-produced volatile products, wherein
R is vinyl, an alkyl group of 1–3 carbon atoms or phenyl;
R' is vinyl, hydrogen, an alkyl group of 1–3 carbon atoms or phenyl; and
n has a value of 1 or 2.

61. A method as described in claim 58 wherein said silazane polymer is prepared by contacting and reacting in an inert, essentially anhydrous, atmosphere at a temperature in the range of 25° C. to 370° C.
(A) ammonia and
(B) chlorine-containing disilanes selected from the group consisting of (i) a chlorine-containing disilane having the general formula $$[Cl_c R_d Si]_2$$

and
(ii) a mixture of chlorine-containing disilanes having the general formula $$[Cl_e R_f Si]_2$$

wherein
c has a value of 1.5–2.0;
d has a value of 1.0–1.5;
the sum of c+d is equal to three;
the ratio of e to f is in the range of 1.1 to 2.1;
the sum of e+f is equal to three; and
R in each case is selected from a group consisting of the vinyl group, and alkyl radical of 1–3 carbon atoms and the phenyl group; and wherein the number of diorgano-substituted silicon atoms in the mixture of chlorine-containg disilanes does not exceed the number of monoorgano-substituted silicon atoms.

62. A fiber reinforced glass composite as prepared by the method of claim 59.

63. A fiber reinforced glass composite as prepared by the method of claim 60.

64. A fiber reinforced glass composite as prepared by the method of claim 61.

* * * * *

UNITED STATES PATENT AND TRADEMARK OFFICE
CERTIFICATE OF CORRECTION

PATENT NO. : 4,460,638
DATED : July 17, 1984
INVENTOR(S) : Loren A. Haluska

It is certified that error appears in the above-identified patent and that said Letters Patent is hereby corrected as shown below:

In column 8, line 25, "fringes" should read --- firings ---.

In column 13, line 19, "impregnated" should read
--- reimpregnated ---.

Signed and Sealed this

Seventh Day of May 1985

[SEAL]

Attest:

DONALD J. QUIGG

Attesting Officer     Acting Commissioner of Patents and Trademarks